United States Patent [19]

Osumi et al.

[11] 4,421,718
[45] Dec. 20, 1983

[54] ALLOY FOR OCCLUSION OF HYDROGEN

[75] Inventors: Yasuaki Osumi, Minou; Hiroshi Suzuki, Ikeda; Akihiko Kato, Matsubara; Keisuke Oguro, Ikeda, all of Japan

[73] Assignees: Agency of Industrial Science & Technology; Ministry of International Trade & Industry, both of Tokyo, Japan

[21] Appl. No.: 423,421

[22] Filed: Sep. 24, 1982

[30] Foreign Application Priority Data

May 27, 1982 [JP] Japan ................... 57-91031

[51] Int. Cl.³ .............................................. C22C 19/05
[52] U.S. Cl. .................................... 420/443; 420/416; 420/900; 420/455; 420/451; 423/644
[58] Field of Search ................ 420/900; 423/644, 648; 420/416, 443, 451, 455

[56]  References Cited

U.S. PATENT DOCUMENTS 4,222,770  9/1980  Osumi et al. ......................... 75/122
4,347,082  8/1982  Osumi et al. ......................... 75/171

Primary Examiner—L. Dewayne Rutledge
Assistant Examiner—Christopher W. Brody
Attorney, Agent, or Firm—Kurt Kelman

[57]  ABSTRACT

An alloy of the general formula:

$$RNi_{5-x}Cr_yA_z$$

(wherein, R denotes one member selected from the group consisting of rare earth metal atoms and Misch metal, A denotes one metal atom selected from the group consisting of titanium, zirconium, hafnium, vanadium, niobium, and tantalum, x denotes a number falling in the range of 0.01 to 2.0, y denotes a number falling in the range of 0.01 to 2.0, and z denotes a number not exceeding 0.2, providing that x, y, and z have the relation, $5.0 \leq 5 - x + y + z \leq 5.2$) is useful as a hydrogen-occluding metal with slight hysteresis.

6 Claims, 2 Drawing Figures

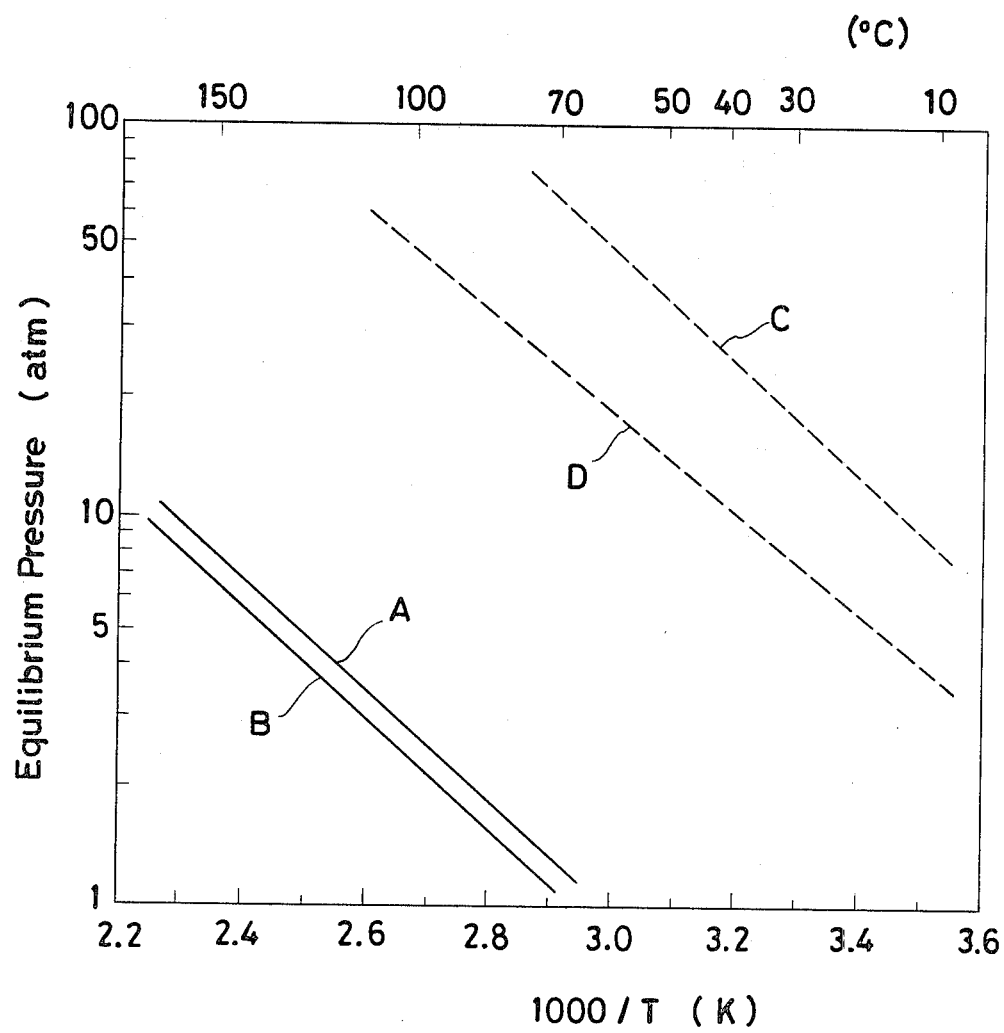

ALLOY FOR OCCLUSION OF HYDROGEN

BACKGROUND OF THE INVENTION

This invention relates to an alloy for the occlusion of hydrogen, and more particularly to an alloy of four elements including a rare earth metal atom for the occlusion of hydrogen.

Hydrogen is an inexhaustible, clean substance capable of being easily transported and stored. As a new source of energy to take the place of fossil fuels, the hydrogen is attracting increasing attention.

Since hydrogen assumes a gaseous state at room temperature and liquefies at an extremely low temperature, development of hydrogen storage technology is urgently required. Recently, the technique of causing hydrogen to be occluded in the form of a metal hydride in a metal has been attracting keen attention as a promising approach to the effective storage of hydrogen.

The occlusion of hydrogen by the metal and the release of hydrogen from the metal are reversible reactions. These reactions proceed with liberation and absorption of a fairly large amount of heat of reaction. The pressures under which the metal occludes and releases hydrogen depend on temperature. Research is being carried out for the purpose of applying this principle to the space cooling and warming system or to the reversible thermal energy to pressure (mechanical) energy conversion system.

The requirements expected to be met by the metal used for the occlusion of hydrogen are that the metal should be available inexpensively and abundantly, that it should be easily activated and should possess a large capacity for the occlusion of hydrogen, that it should possess a suitable equilibrium pressure for hydrogen occlusion and release at or near room temperature, that it should involve little hysteresis of occlusion and release, that it should cause the reactions of hydrogen occlusion and release reversibly, that it should provide speedy hydrogen occlusion and release, and that it should be resistant to comminution.

Various materials have been proposed to the art as useful for the occlusion of hydrogen. Typical examples of such materials are $LaNi_5$ and other $RNi_5$ (wherein, R denotes a rare earth metal atom) and FeTi.

Although these alloys provide reversible reactions of hydrogen occlusion and release and possess large capacities for hydrogen occlusion, their reactions of hydrogen occlusion and release proceed slowly and their activation is not necessarily easy. Moreover, they involve heavy hysteresis and undergo comminution as the reactions of hydrogen occlusion and release are repeated. All these defects have stood in the way of actual use of these alloys.

The inventors formerly ascertained that alloys containing Misch metal provide effective occlusion of hydrogen and invented the following alloys: $Mm_{1-x}Ca_xNi_5$ alloy (U.S. Pat. No. 4,096,639), $MmNi_{5-x}Co_x$ alloy (U.S. Pat. No. 4,147,536), $MmNi_{5-x}A_x$ alloy (U.S. Pat. No. 4,222,770), $MmNi_{5-x}Cr_{x-y}A_y$ alloy (U.S. Ser. No. 192,809, dated Oct. 1, 1980), $Mm_{1-x}Ca_xNi_{5-y}A_y$ alloy (U.S. Ser. No. 222,351, dated Jan. 5, 1981), and $MmNi_{5-x}A_{x-y}B_y$ alloy (U.S. Ser. No. 276,833, dated June 24, 1981). These represent alloys of gradually improved properties for hydrogen occlusion. The $Mm_{1-x}Ca_xNi_5$ alloy has a low production cost but has a high equilibrium pressure for dissociation. The $MmNi_{5-x}Co_x$ alloy has a lower equilibrium pressure for dissociation and a large capacity for hydrogen occlusion. The $MmNi_{5-x}A_x$ alloy is improved in terms of speed of hydrogen occlusion and ease of activation. The $MmNi_{5-x}Cr_{x-y}A_y$ alloy offers constant pressure of dissociation over a wide range of hydrogen/metal atom ratios or a low flatness factor. The $Mm_{1-x}Ca_xNi_{5-y}A_y$ alloy is characterized by a particularly low cost. While the pressure for activation and the pressure for hydrogen occlusion generally fall in the neighborhood of 50 kg/cm², the $MmNi_{5-x}A_{x-y}B_y$ alloy has succeeded in lowering these pressures.

These alloys, however, have large differences between the pressure for hydrogen occlusion and that for hydrogen release, namely large degrees of hysteresis. Thus, development of an alloy which is capable of providing effective hydrogen occlusion with little hysteresis has been longed for.

An object of this invention is to provide an alloy which possesses properties essential for the occlusion of hydrogen and involves only slight hysteresis.

SUMMARY OF THE INVENTION

The object described above is satisfied by the alloy of this invention. It has been developed for the purpose of eliminating all the defects suffered by the conventional alloys for the occlusion of hydrogen. It is capable of occluding a large volume of hydrogen in the form of metal hydride and capable of easily and quickly releasing the occluded hydrogen. It has a very small difference between the pressure of hydrogen occlusion and that for hydrogen release, namely an extremely small degree of hysteresis, and is resistant to comminution.

To be specific, this invention relates to an alloy of the general formula, $RNi_{5-x}Cr_yA_z$, for the occlusion of hydrogen. In the formula, R denotes a rare earth metal atom, A denotes a metal atom selected from the group consisting of titanium, zirconium, hafnium, vanadium, niobium, and tantalum, x denotes a number in the range of 0.01 to 2.0, y denotes a number in the range of 0.01 to 2.0, and z denotes a number not exceeding 0.2, providing that, x, y, and z satisfy the relation $5.0 \leq 5 - x + y + Z \leq 5.2$.

BRIEF DESCRIPTION OF THE DRAWINGS

FIG. 1 is a diagram showing the relations of pressure and temperature as involved during the occlusion and release of hydrogen by the alloy of this invention indicated in Example 1 and by a conventional three-element alloy.

FIG. 2 is a diagram showing the relations of pressure and temperature as involved during the occlusion and release of hydrogen by the alloy of this invention indicated in Example 2 and by a conventional three-element alloy.

DESCRIPTION OF THE PREFERRED EMBODIMENTS

As described above, the alloy of the present invention is represented by the general formula:

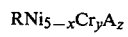

$$RNi_{5-x}Cr_yA_z$$

In this invention, the substituents R embraces not merely a rare earth metal atom but also a Misch metal, Mm.

Generally, Misch metal comprises 25 to 35% (by weight, similarly hereinafter) of lanthanum, 40 to 50% of cerium, 1 to 15% of praseodymium, 4 to 15% of neodymium, 1 to 7% of samarium+gadolinium, 0.1 to 5% of iron, 0.1 to 1% of silicon, 0.1 to 2% of magnesium, 0.1 to 1% of aluminum, etc.

Basically the alloy of the present invention, therefore, is obtained either by substituting one metal, A, selected from the group consisting of titanium, zirconium, hafnium, vanadium, niobium, and tantalum for part of the chromium atoms in the $RNi_{5-\alpha}Cr_\alpha$ alloy resulting from the substitution of chromium atoms for part of the nickel atoms in the alloy $RNi_5$ which is an alloy of a rare earth metal R with nickel or by adding a metal, A, selected from the group consisting of titanium, zirconium, hafnium, vanadium, niobium, and tantalum to an $ANi_{5-\alpha}Cr_\alpha$ alloy.

It is known that a rare earth metal R and nickel generally form a $CaCu_5$ type hexagonal system and produce a metal compound of $RNi_5$. Other $RNi_5$ metal compounds than $LaNi_5$ have high pressures for hydrogen occlusion and release at or near room temperature.

For example, the pressures for hydrogen occlusion and release are 20 to 40 atmospheres with $MmNi_5$ and 40 to 80 atmospheres with $CeNi_5$ and $SmNi_5$. Substitution of chromium atoms for part of the nickel atoms in these metal compounds lowers the pressures for hydrogen occlusion and release.

In the case of $RNi_5$ alloys between rare earth metals and nickel, for example, substitution of chromium atoms for part of the nickel atoms in the alloys produce alloys represented by the general formula, $RNi_{5-\alpha}Cr_\alpha$. When the latter alloys are prepared in compositions such that the value of $\alpha$ will fall in the range of 0.01 to 2.0, the pressures for hydrogen occlusion and release are notably lowered. Preferably, the value of $\alpha$ is in the range of 0.1 to 1.0.

The variable "$\alpha$" corresponds to the variables "x" and "y" in the general formula, $RNi_{5-x}Cr_yA_z$, for the alloy of the present invention. Thus, the range of "$\alpha$" ought to equal the range of "x" and that of "y." Therefore, the value of x and that of y are both in the range of 0.01 to 2.0.

When x and y exceed 2.0, the release of the occluded hydrogen becomes difficult. The release is not obtained unless the alloy is heated to an elevated temperature. Occasionally, the application of heat must be performed in combination with a reduction of pressure.

When x and y are less than 0.01, the amount of Mm substitution is too small to permit any appreciable decrease of the pressures for hydrogen occlusion and release.

Owing to the incorporation of chromium atoms, the alloy of $RNi_{5-\alpha}Cr_\alpha$ has a larger difference between the pressure for hydrogen occlusion and that for hydrogen release or a larger degree of hysteresis and, at the same time, undergoes heavy comminution when the cycle of hydrogen occlusion and hydrogen release is repeated.

In the alloy of a composition of $MmNi_{4.5}Cr_{0.5}$, for example, the pressure for hydrogen occlusion is about 8 atmospheres at 10° C., the pressure for hydrogen release is about 4 atmospheres, and the hysteresis is as much as about 4 atmospheres. When the hysteresis is large, the alloy for hydrogen occlusion or the metal hydride thereof must be heated and cooled at widely different temperatures or the hydrogen must be exposed to two widely different levels of pressure. Consequently, the capacity for hydrogen occlusion and the heat of hydrogenation reaction cannot be utilized to advantage.

As the alloy occludes and releases hydrogen repeatedly, it alternately undergoes expansion and contraction and eventually yields to comminution. In consequence of this phenomenon, the packing density of alloy in its container increases and the volume of alloy decreases. When the hydrogenation is continued under such conditions, the volumetric ratio of the alloy before occlusion to the alloy after occlusion or the expansion of the alloy due to occlusion of hydrogen is increased so much as to cause local stress in the container, with the result that the container develops strain and suffers from leakage of hydrogen. Further, the packed bed of alloy loses its efficiency of thermal conduction. The comminuted metal hydride or alloy mingles with the departing hydrogen gas and causes clogging of pipes and valves. It has been ascertained that in the case of the alloy of a composition of $MmNi_{4.5}Cr_{0.5}$, for example, most of the alloy is heavily comminuted to a particle size of less than 10 $\mu$m after 500 cycles of hydrogen occlusion and release. Comminution constitutes itself an intrinsic problem for most metal hydrides, though with varying consequences. For actual use of alloys for hydrogen occlusion, therefore, proper measures of some sort or other are desired to be taken with respect to this problem.

This invention has solved the problems of hysteresis and comminution by substituting one metal A selected from the group consisting of titanium, zirconium, hafnium, vanadium, niobium, and tantalum for part of the chromium atoms in the alloy of $RNi_{5-\alpha}Cr_\alpha$ or by adding one metal selected from among titanium, zirconium, hafnium, vanadium, niobium, and tantalum to the alloy of $RNi_{5-\alpha}Cr_\alpha$. Among the metals mentioned above, zirconium and titanium are particularly effective in lowering hysteresis and curbing comminution. In the alloy $RNi_{5-x}Cr_yA_z$ of this invention which has substituted part of the chromium atoms in the alloy of $RNi_{5-\alpha}Cr_\alpha$ with one metal A selected from the aforementioned group, the relations of $x=y+z$ and $y \geq$ are satisfied, z has a value of not more than 0.2, and x, y, and z satisfy the equation, $5-x+y+z=5$. In this case, the alloy of this invention forms a metal compound of RNi type hexagonal system.

In the alloy $RNi_{5-x}Cr_yA_z$ of this invention which has added one metal A selected from the aforementioned group to the alloy of $RNi_{5-\alpha}Cr_\alpha$, the relations $x=y$ and $y \geq z$ are satisfied, z assumes a value of not more than 0.2, preferably less than 0.1, and x, y, and z satisfy the expression $5.0 < 5 = x+y+z \leq 5.2$. Although the structure of the alloy of this invention at the time of the addition of the metal A is not clear, the alloy is basically a metal compound of the $RNi_5$ type. When the value of z is greater than 0.2, the capacity of the alloy for hydrogen occlusion is lowered and the plateau region in the curves of hydrogen occlusion and release pressures tends to assume a two-step shape. Thus, the value of z is not desired to exceed 0.2.

Besides the aforementioned two typical forms involving the substitution and the addition of the metal A, the form in which the metal A has been substituted for part of the alloy of $RNi_{5-\alpha}Cr_\alpha$ and, at the same time, has been added to the same alloy is also embraced by the present invention.

For manufacture of an alloy of this invention for the occlusion of hydrogen, any of various known methods may be adopted. Among other methods, the arc fusion method is particularly suitable. Specifically, the alloy is produced by separately weighing out the components, namely, a rare earth metal, nickel, chromium, and a metal A, mixing the components, press molding the resultant mixture in a desired shape, then setting the mold in position inside an arc fusion furnace, thermally fusing the mold in an inert atmosphere, and allowing the fused mold to cool off. The alloy for hydrogen occlusion thus produced is put to use in a powdered form as is usually practiced in the art, to increase its surface area.

The hydrogen-occulsion alloy of the present invention can be activated very easily. After the activation, this alloy can easily and quickly occlude a large volume of hydrogen and release it. The activation is accomplished by thermally degasing the alloy at 80° C. in an atmosphere reduced in pressure by a rotary pump and then subjecting the alloy to just one cycle of hydrogen occlusion and release.

This operation of hydrogen occlusion and release involving the formation of a metal hydride is carried out by placing the powdered alloy in a suitable container, degasing the alloy, filling the container with hydrogen at room temperature, and applying hydrogen pressure of not more than 20 kg/cm$^2$ to the alloy in the container.

As indicated above, the conversion of the hydrogen-occlusion alloy of this invention to a hydride is accomplished by application of a low hydrogen pressure of not more than 20 kg/cm$^2$ in a very short duration of several minutes and at normal room temperature.

The release of hydrogen from the hydride can be effected simply by opening the container at room temperature. This release of hydrogen, however, can be effected more quickly and efficiently by either heating the metal hydride to a temperature slightly higher than room temperature or lowering the pressure of the container.

The hydrogen-occlusion alloy of the present invention can be activated very easily and, after the activation, provides hydrogen occlusion and release very quickly as compared with the conventional alloy.

Owing to the presence of the metal A, the difference between the pressures of hydrogen occlusion and release, namely, the hysteresis is about 0.5 atmosphere in the alloy composition of $MmNi_{4.5}Cr_{0.5}Zr_{0.05}$ and 1.5 to 2.0 atmospheres in the alloy compositions of $MmNi_{4.5}Cr_{0.5}Ti_{0.05}$, $MmNi_{4.5}Cr_{0.45}V_{0.05}$, and $MmNi_{4.5}Cr_{0.45}Nb_{0.05}$. Hysteresis on this order is less than half the hysteresis suffered by the conventional alloy of the composition $MmNi_{4.5}Cr_{0.5}$ which involves neither substitution nor addition of the metal A.

The alloys of the compositions of $MmNi_{4.5}Cr_{0.5}Zr_{0.05}$ and $MmNi_{4.5}Cr_{0.5}Zr_{0.1}$, for example, are comminuted to particle sizes of about 30 μm and 60 μm respectively after 500 cycles of hydrogen occlusion and release. Comminution on this order is notably small as compared with the comminution suffered by the conventional alloy of the composition of $MmNi_{4.5}Cr_{0.5}$ which involves no addition of the metal A. This fact implies that the repressed comminution is ascribable to Zr, namely, the metal A.

As described above, the hydrogen-occlusion alloy of this invention is a novel alloy and possesses all the properties expected of a hydrogen-occlusion alloy. Particularly with respect to the hysteresis of the pressures of hydrogen occlusion and release and the comminution, the alloy of this invention enjoys a notable improvement over the conventional hydrogen-occlusion alloy. The capacity for hydrogen occlusion and the heat of reaction of hydrogen occlusion and release can be utilized to advantage.

Moreover, the four-element hydrogen-occlusion alloy of this invention provides very easy activation for the reactions of hydrogen occlusion and release. It can occlude a large volume of hydrogen to a high density. It can occlude and release hydrogen at or near room temperature. It undergoes substantially no perceivable degradation of quality no matter how often the cycle of hydrogen occlusion and release may be repeated. It yields to comminution only sparingly. Thus, the alloy enjoys a long service life. Impurities such as oxygen, nitrogen, argon, and carbon dioxide which are entrained by hydrogen to be occluded are not observed to have any adverse effect upon the behavior of the alloy. The alloy is thus a highly useful material for the occlusion of hydrogen and can be expected to manifest its outstanding effect not merely for the primary purpose of hydrogen storage but also for the purpose of utilization of the heat of reaction of hydrogen occlusion and release.

Now, the present invention will be described more specifically below with reference to working examples.

EXAMPLE 1

Commercially available Misch metal, nickel, chromium, and a metal A (Ti, Zr, Hf, V, Nb, or Ta) were weighed out in amounts satisfying an atomic ratio, Mm:Ni:Cr:A, of 1:4.5:0.5:0.05. They were placed in a copper crucible within a high-vacuum arc fusion furnace. With the interior of the furnace displaced with argon of high purity, the mixture in the crucible was fused at about 2000° C. and cooled. Thus, there were obtained alloys of the compositions of $MmNi_{4.5}Cr_{0.5}Ti_{0.05}$, $MmNi_{4.5}Cr_{0.5}Zr_{0.05}$, $MmNi_{4.5}Cr_{0.5}Hf_{0.05}$, $MmNi_{4.5}Cr_{0.5}V_{0.05}$, $MmNi_{4.5}Cr_{0.5}Nb_{0.05}$ and $MmNi_{4.5}Cr_{0.5}Ta_{0.05}$. Each alloy thus obtained was crushed to 120 mesh. A 5.0 g-portion of the crushed alloy was placed in a stainless steel reactor for hydrogen occlusion and release. With the reactor connected to an evacuator, the alloy was degased thermally at 80° C. under reduced pressure.

Then hydrogen of purity of 99.999% was introduced into the reactor. When the hydrogen pressure within the reactor was retained not higher than 10 kg/cm$^2$, immediate occlusion of hydrogen by the alloy was recognized. After the occlusion of hydrogen, the interior of the reactor was evacuated to complete release of hydrogen. This treatment completed activation of the alloy.

To the activated alloy in the reactor, hydrogen of purity of 99.999% was introduced under hydrogen pressure of not more than 10 kg/cm$^2$ at room temperature and left to be occluded.

Although the release of occluded hydrogen could be effected at room temperature, it was carried out more efficiently by applying heat to the reactor or reducing the pressure of the reactor interior or applying these treatments at the same time.

During the operation of hydrogen occlusion and release by the varying hydrogen-occlusion alloy samples mentioned above, the relations of pressure and temperature were noted. Of the data obtained of the alloy sample of the composition of $MmNi_{4.5}Cr_{0.5}Zr_{0.05}$-H type, the logarithm of pressure and the reciprocal of absolute temperature are plotted in FIG. 1.

In FIG. 1, the straight line A represents the pressure of hydrogen occlusion and the straight lines B the pressure of hydrogen release. The dotted straight lines C and D represent the results obtained of a three-element hydrogen-occlusion alloy of the composition MmNi$_{4.5}$Cr$_{0.5}$ used for the purpose of comparison, the straight line C representing the pressure of hydrogen occlusion and the straight line D the pressure of hydrogen release.

It is noted from FIG. 1 that the alloy of this invention is notably improved in terms of hysteresis as compared with the conventional hydrogen-occlusion alloy used for the purpose of comparison.

The various alloy samples obtained as described above were tested to determine their capacity for hydrogen occlusion, the logarithm of the ratio of the pressure of hydrogen occlusion to the pressure of hydrogen release, namely the hysteresis factor, and the average particle diameter of alloy after 500 cycles of hydrogen occlusion and release. The results are shown in Table 1.

It is clear from Table 1 that the alloys No. 1 through No. 6 of the present invention have low hysteresis factors, yield only sparingly to comminution, and possess substantially equal capacities for hydrogen occlusion as compared with the conventional alloy (MmNi$_{4.5}$Cr$_{0.5}$: Sample No. 7).

TABLE 1

| Sample No. | Alloy composition | Capacity for hydrogen occlusion (% by wt) | Hysteresis factor (Hf)* | Average particle diameter ($\mu$m) |
|---|---|---|---|---|
| 1 | MmNi$_{4.5}$Cr$_{0.5}$Ti$_{0.05}$ | 1.6 | 0.22 | 30 |
| 2 | MmNi$_{4.5}$Cr$_{0.5}$Zr$_{0.05}$ | 1.6 | 0.07 | 30 |
| 3 | MmNi$_{4.5}$Cr$_{0.5}$Hf$_{0.05}$ | 1.5 | 0.30 | 30 |
| 4 | MmNi$_{4.5}$Cr$_{0.5}$V$_{0.05}$ | 1.6 | 0.20 | 25 |
| 5 | MmNi$_{4.5}$Cr$_{0.5}$Nb$_{0.05}$ | 1.6 | 0.20 | 25 |
| 6 | MmNi$_{4.5}$Cr$_{0.5}$Ta$_{0.05}$ | 1.5 | 0.35 | 25 |
| 7 | MmNi$_{4.5}$Cr$_{0.5}$ | 1.5 | 0.70 | 7 |

*Hf = lnPa/Pd
Hf: Hysteresis factor
Pa: Plateau pressure of hydrogen occlusion
Pd: Plateau pressure of hydrogen release

EXAMPLE 2

By following the procedure of Example 1, alloys of the composition MmNi$_{4.5}$Cr$_{0.45}$A$_{0.05}$ (wherein, A denotes Ti, Zr, Hf, V, Nb, or Ta) were prepared and activated. They were tested for hydrogen occlusion and release to determine the relation of hydrogen and temperature as factors effecting the alloy's capacity for hydrogen occlusion and release. Of the data obtained of the alloy sample of the composition of MmNi$_{4.5}$Cr$_{0.45}$Zr$_{0.05}$-H type, the logarithm of pressure ratio and the reciprocal of absolute temperature were plotted in FIG. 2.

In FIG. 2, the straight lines E and G represent pressures of hydrogen occlusion and the straight lines G and H represent the pressure-temperature relation obtained of a three-element hydrogen-occlusion alloy of the composition of MmNi$_{4.5}$Cr$_{0.5}$ used for the purpose of comparison as in Example 1.

It is clear from FIG. 2 that the alloys of this invention were notably improved in terms of hysteresis as compared with the conventional alloy.

The hysteresis factors of the alloys of this invention were 0.07 to 0.35. After 500 cycles of hydrogen occlusion and release, the alloys had average particle diameters of 25 to 30 $\mu$m. These results indicate that the alloys of this invention exhibited better properties than the conventional alloy. Besides, the capacities for hydrogen occlusion were 1.5 to 1.6 weight %, a value substantially equal to that of the conventional alloy 1.5 weight %).

EXAMPLE 3

By following the procedure of Example 1, alloys of the compositions of MmNi$_{4.5}$Cr$_{0.5}$Zr$_{0.05}$, MmNi$_{4.5}$Cr$_{0.5}$Zr$_{0.1}$, and MmNi$_{4.5}$Cr$_{0.5}$Zr$_{0.2}$ were prepared and activated. They were subjected to 500 cycles of hydrogen occlusion and release using hydrogen of purity of 99.5%. After the treatment, the alloys were measured for average particle diameter.

Table 2 shows the average particle diameters obtained of the alloys of this invention after 500 cycles of hydrogen occlusion and release. These average particle diameters are large as compared with the average particle diameter of the conventional alloy (MmNi$_{4.5}$Cr$_{0.5}$: Sample No. 4), suggesting that the addition of Zr served to repress comminution of alloy to a great extent.

TABLE 2

| Sample No. | Alloy composition | Average particle diameter ($\mu$m) |
|---|---|---|
| 1 | MmNi$_{4.5}$Cr$_{0.5}$Zr$_{0.05}$ | 30 |
| 2 | MmNi$_{4.5}$Cr$_{0.5}$Zr$_{0.1}$ | 60 |
| 3 | MmNi$_{4.5}$Cr$_{0.5}$Zr$_{0.2}$ | 70 |
| 4 | MmNi$_{4.5}$Cr$_{0.5}$ | 7 |

EXAMPLE 4

By following the procedure of Example 1, alloys of the composition LaNi$_{4.5}$Cr$_{0.5}$A$_{0.05}$ (wherein, A denotes Ti, Zr, Hf, V, Nb, or Ta) were prepared and activated and tested for hydrogen occlusion and release.

Table 3 shows the capacities for hydrogen occlusion, the hysteresis factors, and the average particle diameters after 500 cycles of hydrogen occlusion and release obtained of the alloy samples of the present invention. It is noted from Table 3 that the alloys of the present invention had smaller hysteresis factors and larger average particle diameters than the conventional alloy (LaNi$_{4.5}$Cr$_{0.5}$: Sample No. 7), indicating that the addition of Zr served to repress comminution of alloy to a great extent.

TABLE 3

| Sample No. | Alloy composition | Capacity for hydrogen occlusion (% by wt) | Hysteresis factor (Hf)* | Average particle diameter ($\mu$m) |
|---|---|---|---|---|
| 1 | LaNi$_{4.5}$Cr$_{0.5}$Ti$_{0.05}$ | 1.6 | 0.15 | 30 |
| 2 | LaNi$_{4.5}$Cr$_{0.5}$Zr$_{0.05}$ | 1.6 | 0.10 | 30 |
| 3 | LaNi$_{4.5}$Cr$_{0.5}$Hf$_{0.05}$ | 1.5 | 0.20 | 30 |
| 4 | LaNi$_{4.5}$Cr$_{0.5}$V$_{0.05}$ | 1.6 | 0.15 | 25 |
| 5 | LaNi$_{4.5}$Cr$_{0.5}$Nb$_{0.05}$ | 1.5 | 0.20 | 25 |
| 6 | LaNi$_{4.5}$Cr$_{0.5}$Ta$_{0.05}$ | 1.5 | 0.20 | 25 |
| 7 | LaNi$_{4.5}$Cr$_{0.5}$ | 1.5 | 0.40 | 5 |

*Hf = lnPa/Pd
Hf: Hysteresis factor
Pa: Plateau pressure of hydrogen occlusion
Pd: Plateau pressure of hydrogen release

What is claimed is:

1. A quaternary hydrogen-occluding alloy with slight hysteresis represented by the general formula:

$$RNi_{5-x}Cr_yA_z$$

wherein, R denotes one member selected from the group consisting of rare earth metal atoms and Misch metal, A denotes one metal atom selected from the group consisting of titanium, zirconium, hafnium, vanadium, niobium, and tantalum, x denotes a number falling in the range of 0.01 to 2.0, y denotes a number falling in the range of 0.01 to 2.0, and z denotes a number greater than 0 but not exceeding 0.2, providing that x, y, and z have the relation, $5.0 \leq 5-x+y+z \leq 5.2$.

2. A hydrogen-occluding alloy according to claim 1, wherein x, y, and z have the relations, $x=y+z$ and $y \geq z$.

3. A hydrogen-occluding alloy according to claim 1, wherein x, y, and z have the relations, $x=y$ and $y \geq z$, and z has a value not exceeding 0.1.

4. A hydrogen-occluding alloy according to claim 1, wherein R is Misch metal.

5. A hydrogen-occluding alloy according to claim 1, wherein A is zirconium.

6. A hydrogen-occluding alloy according to claim 1, wherein A is titanium.

* * * * *

UNITED STATES PATENT AND TRADEMARK OFFICE
CERTIFICATE OF CORRECTION

PATENT NO. : 4,421,718

DATED : December 20, 1983

INVENTOR(S) : Yasuaki Osumi et al.

It is certified that error appears in the above-identified patent and that said Letters Patent is hereby corrected as shown below:

Fig. 2, should appear as shown on the attached sheet.

Signed and Sealed this

Tenth Day of April 1984

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,421,718
DATED : December 20, 1983
INVENTOR(S) : Yasuaki Osumi et al.

It is certified that error appears in the above-identified patent and that said Letters Patent is hereby corrected as shown below:

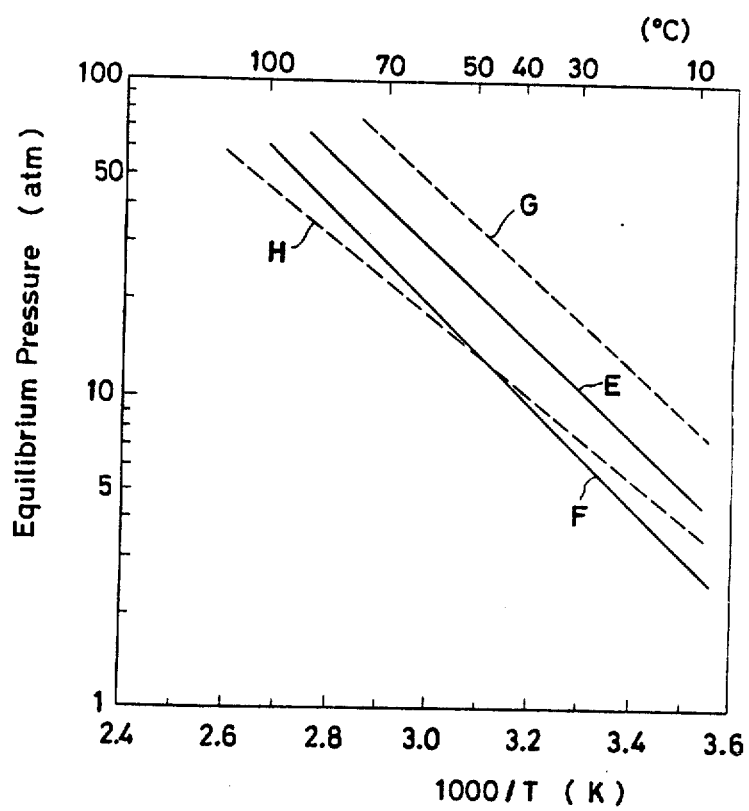

Fig_2